(12) United States Patent
Jovanovic et al.

(10) Patent No.: US 6,870,664 B2
(45) Date of Patent: Mar. 22, 2005

(54) NONDEGENERATE OPTICAL PARAMETRIC CHIRPED PULSE AMPLIFIER

(75) Inventors: Igor Jovanovic, Oakland, CA (US); Christopher A. Ebbers, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 296 days.

(21) Appl. No.: 10/316,764

(22) Filed: Dec. 11, 2002

(65) Prior Publication Data

US 2003/0128423 A1 Jul. 10, 2003

Related U.S. Application Data

(60) Provisional application No. 60/341,380, filed on Dec. 13, 2001.

(51) Int. Cl.[7] .............................. H01S 3/00; H03F 7/00
(52) U.S. Cl. ........................................ 359/333; 330/4.5
(58) Field of Search ............................... 359/330, 333; 330/4.5

(56) References Cited

U.S. PATENT DOCUMENTS

| | | | |
|---|---|---|---|
| 5,047,668 A | 9/1991 | Bosenberg ................... 359/330 |
| 5,400,350 A | 3/1995 | Galvanauskas et al. ........ 372/20 |
| 5,696,782 A | 12/1997 | Harter et al. ................. 372/25 |
| 5,812,305 A * | 9/1998 | Blake et al. ................ 359/330 |
| 5,862,287 A | 1/1999 | Stock et al. ................ 385/123 |
| 5,930,030 A | 7/1999 | Scifres ..................... 359/341.3 |
| 6,181,463 B1 | 1/2001 | Galvanauskas et al. ..... 359/345 |
| 6,198,568 B1 | 3/2001 | Galvanauskas et al. ..... 359/332 |
| 6,208,458 B1 | 3/2001 | Galvanauskas et al. ..... 359/345 |
| 6,282,014 B1 | 8/2001 | Long ........................... 359/330 |
| 6,320,886 B1 | 11/2001 | Dawber et al. .............. 372/22 |
| 6,334,011 B1 | 12/2001 | Galvanauskas et al. ....... 385/22 |
| 6,359,914 B1 * | 3/2002 | Powers et al. ............... 372/25 |
| 6,728,273 B2 * | 4/2004 | Perry ........................ 359/330 |
| 6,757,096 B2 * | 6/2004 | Schiller ...................... 359/330 |
| 6,791,743 B2 * | 9/2004 | Jovanovic et al. .......... 359/333 |
| 6,804,044 B2 * | 10/2004 | Van Der Veer ............. 359/330 |
| 2001/0031110 A1 * | 10/2001 | Imajuku et al. ............... 385/15 |
| 2002/0001321 A1 | 1/2002 | Perry ........................ 372/22 |
| 2004/0012841 A1 * | 1/2004 | McCarthy .................... 359/330 |
| 2004/0095634 A1 * | 5/2004 | Paschotta et al. ........... 359/330 |

OTHER PUBLICATIONS

Mark A. Dreger, et al., "Coupled thermal and nonlinear effects for beam propagation in anisotropic crystals," SPIE, vol. 2145, pp. 254–269 (16 pages), 0–8194–1440, 9/94.

John Collier, et al., "Evaluation of an ultrabroadband high–gain amplification technique for chirped pulse amplification facilities," Applied Optics, vol. 38, No. 36, pp. 7486–7493, (8 pages), Dec. 20, 1999.

(List continued on next page.)

Primary Examiner—Thomas H. Tarcza
Assistant Examiner—Deandra M. Hughes
(74) Attorney, Agent, or Firm—Eddie E. Scott; Alan H. Thompson

(57) ABSTRACT

A system provides an input pump pulse and a signal pulse. A first dichroic beamsplitter is highly reflective for the input signal pulse and highly transmissive for the input pump pulse. A first optical parametric amplifier nonlinear crystal transfers part of the energy from the input pump pulse to the input signal pulse resulting in a first amplified signal pulse and a first depleted pump pulse. A second dichroic beamsplitter is highly reflective for the first amplified signal pulse and highly transmissive for the first depleted pump pulse. A second optical parametric amplifier nonlinear crystal transfers part of the energy from the first depleted pump pulse to the first amplified signal pulse resulting in a second amplified signal pulse and a second depleted pump pulse. A third dichroic beamsplitter receives the second amplified signal pulse and the second depleted pump pulse. The second depleted pump pulse is discarded.

12 Claims, 2 Drawing Sheets

OTHER PUBLICATIONS

David Eimerl, "High Average Power Harmonic Generation," IEEE Journal of Quantum Electronics, vol. QE–23, No. 5, pp. 575–592 (18 pages), May 1987.

David Eimerl, "Frequency conversion materials from a device perspective," SPIE vol. 681, Laser and Nolinear Optical Materials, pp. 2–5 (4 pages), 1986.

A. Dubietis, et al., "Powerful femtosecond pulse generation by chirped and stretched pulse parametric amplification in BBO crystal," Optics Communications 88, pp. 437–440 (4 pages), Apr. 1, 1992.

* cited by examiner

NONDEGENERATE OPTICAL PARAMETRIC CHIRPED PULSE AMPLIFIER

CROSS-REFERENCE TO RELATED APPLICATIONS

This application claims the benefit of U.S. Provisional Application No. 60/341,380, filed Dec. 13, 2001, titled "Nondegenerate Optical Parametric Chirped Pulse Amplifier." U.S. Provisional Application No. 60/341,380, filed Dec. 13, 2001, titled "Nondegenerate Optical Parametric Chirped Pulse Amplifier" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to optical parametric chirped pulse amplification and more particularly to a system for nondegenerate optical parametric chirped pulse amplification.

2. State of Technology

U.S. Pat. No. 2002/0001321 for an ultrashort-pulse laser machining system employing a parametric amplifier to Michael D. Perry, published Jan. 3, 2002 provides the following background information, "Bulk optical parametric amplifiers have not been considered to date for moderate to high average power, ultrashort-pulse applications. The present optical parametric amplifier system does not rely on quasi-phase matching and can achieve both high average power and high gain for broad bandwidth chirped-pulses from a single or double stage system. By relying on parametric conversion rather than conventional laser amplification, there is no residual energy left within the gain medium. As a result, there are negligible thermal gradients and hence, one eliminates the depolarization and pulse distortion problems that severely impact the pulse quality and electrical to optical conversion efficiency of high average power ultrashort-pulse lasers. In addition to eliminating many of the thermal management problems associated with the high gain amplifier, the use of a parametric amplifier enables the production of the necessary ultrashort duration pulses from a simplified and more compact system. The pulses exiting the parametric amplifier may be compressed directly and used for machining or surgery or may be further amplified in a conventional laser amplifier to provide additional pulse energy before compression."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for producing a useful optical pulse. The system includes source of an input pump pulse and a source of a signal pulse. A first dichroic beamsplitter receives the input pump pulse and the signal pulse. The first dichroic beamsplitter is highly reflective for the input signal pulse and highly transmissive for the input pump pulse.

A first optical parametric amplifier nonlinear crystal receives the signal pulse and input pump pulse from the first dichroic beamsplitter. The first optical parametric amplifier nonlinear crystal transfers part of the energy from the input pump pulse to the input signal pulse resulting in a first amplified signal pulse and a first depleted pump pulse.

A second dichroic beamsplitter receives the first amplified signal pulse and the first depleted pump pulse. The second dichroic beamsplitter is highly reflective for the first amplified signal pulse and highly transmissive for the first depleted pump pulse.

A second optical parametric amplifier nonlinear crystal receives the first amplified signal pulse and the first depleted pump pulse from the second dichroic beamsplitter. The first optical parametric amplifier nonlinear crystal transfers part of the energy from the first depleted pump pulse to the first amplified signal pulse resulting in a second amplified signal pulse and a second depleted pump pulse.

A third dichroic beamsplitter receives the second amplified signal pulse and the second depleted pump pulse. The second depleted pump pulse is discarded. The second amplified signal pulse results in the useful optical pulse.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
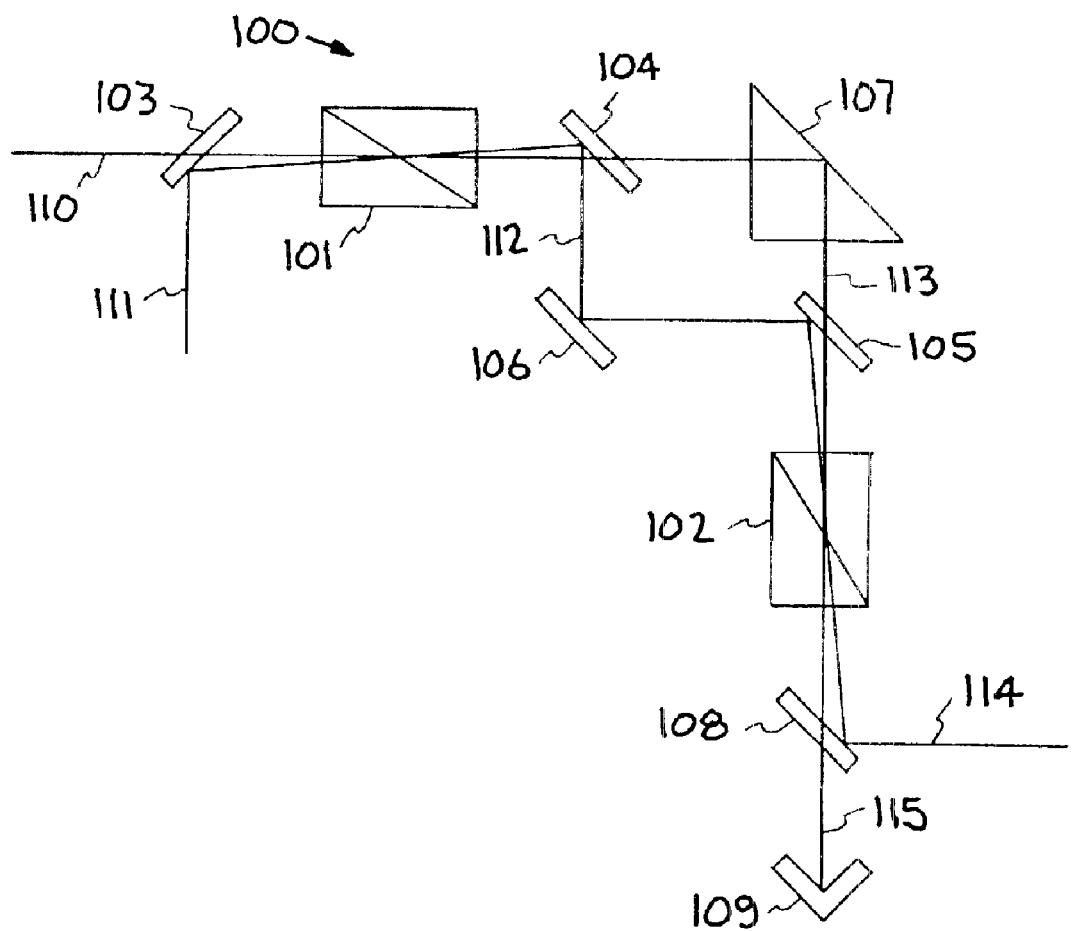
FIG. 1 illustrates one embodiment of an OPCPA system constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings, and in particular to FIG. 1, one embodiment of an OPCPA system constructed in accordance with the present invention is illustrated. The system is designated generally by the reference numeral 100. The system 100 has many uses, for example the system 100 can be used for material processing, laser-based micromachining, high-field laser/matter interactions, and advance x-ray production.

Generation and amplification of ultrashort laser pulses has been at the forefront of laser research in the recent period. The development has been driven primarily by newly accessible physics phenomena and applications. CPA allows a wealth of new high-field experiments to be performed in the previously inaccessible high-intensity regime. Generation and acceleration of energetic particle beams, laser-induced nuclear reactions, and laser-driven cluster fusion are some of the exciting recent achievements. Short X-ray pulse generation has been driven by the production of energetic ultrashort pulses from CPA systems. Finally, a great interest exists in the phenomena that occur beyond $10^{21}$ W/cm$^2$, the highest intensity achieved to date.

Laser oscillators based on mode-locked Ti:sapphire have produced pulses as short as 5 fs. On the other hand, CPA in Ti:sapphire has been used to produce pulses shorter than 20 fs. Maximum peak power from a CPA system of 1.2 PW was achieved using a hybrid Ti:sapphire-Nd:glass laser, with a pulse duration of 450 fs, limited by gain narrowing in Nd:glass. Peak power in CPA systems remains fundamentally limited by the size and damage threshold of the diffraction gratings used in the pulse compressor. State-of-the-art metallic diffraction gratings have a maximum diameter of ~1 m, with the damage threshold of 0.5 J/cm$^2$. This gives a maximum of ~500 J of energy that can be compressed in a 30-cm beam.

In order to increase the peak power, but surmount the optical damage of diffraction gratings in the pulse compressor, the preferred approach would be to reduce the pulse duration. This leads to a very limited selection of laser materials that allow extremely broad bandwidth to be amplified, such as Ti:sapphire and Cr:LiSAF. A problem with those materials is their insufficient scalability to large aperture with good optical quality. An additional problem in high peak power systems is the prepulse, which can be of detrimental effect in applications that include focusing the pulses on targets, thereby producing extreme intensities. OPCPA offers a way to overcome those difficulties through its ultrabroad bandwidth capability, coupled with the extremely large available apertures of nonlinear crystals such as KDP. This offers a way to scale the peak power of CPA systems beyond the 1 PW level.

Optical parametric amplifiers (OPAs) have been shown to be capable of amplifying pulses as short as 5 fs through group velocity matching by tilting the pulse front. Noncollinear geometry can produce a very broad bandwidth, which was used in femtosecond, thin-crystal OPAs. However, short-pulse amplification capability of relatively thick (~cm) crystals used in optical parametric chirped pulse amplification (OPCPA) remains largely unexplored. In a study of the extent of gain bandwidth, a glimpse of possible ultrashort pulse amplification was offered, but no recompression has been performed. The first degenerate OPCPA experiment showed pulse recompression to 70 fs, but the stretching ratio was only ~18, allowing a very small energy to be extracted from the pump pulse. Subsequent nearly degenerate experiments with large stretching ratios and large pump lasers produced recompressed pulses of ~280 fs when pumped by tabletop Q-switched pump lasers. A highly efficient OPCPA in periodically poled lithium niobate pumped by a fiber laser produced 680 fs pulses. In all cases with large stretching ratios, recompression far worse than the transform limit was attributed to the uncompensated higher order phase in the stretcher-compressor pair.

The system 100 provides a design for a nondegenerate OPCPA system. The attractiveness of nondegenerate OPCPA compared to nearly degenerate OPCPA from generally broader bandwidth that can be obtained in noncollinear geometry for the same crystal length, and a favorable energy splitting ratio to signal, which improves the conversion efficiency to signal. As a disadvantage of noncollinear geometry, it is necessary to point out the large noncollinear walk-off of the three beams in a relatively long crystal, limiting the approach to higher peak power, high-energy pump pulses.

The system 100 contains two independently mounted OPA nonlinear crystals, 101 and 102, with horizontal principal planes. An input signal pulse 111 and input pump pulse 110 are coupled by means of a first dichroic beamsplitter 103 into the first OPA 101. The first dichroic beamsplitter 103 is highly reflective for the input signal pulse 111 wavelength and polarization, and highly transmissive for the input pump pulse 110 wavelength and polarization.

By means of difference-frequency generation in OPA 101, part of the energy of the pump pulse 110 is transferred to the signal pulse 111 to produce a first amplified signal pulse 112 and a first depleted pump pulse 113.

The first amplified signal pulse 112 and the first depleted pump pulse 113 are separated using a second dichroic beamsplitter 104. A turning prism or mirror 107 is used to steer the first depleted pump pulse 113 through a third dichroic beamsplitter 105. A turning mirror 106 is used to steer the first amplified signal pulse 112 onto the third dichroic beamsplitter 105. The third dichroic beamsplitter 105 is highly reflective for the first amplified signal pulse 112 wavelength and polarization, and highly transmissive for the first depleted pump pulse 113 wavelength and polarization.

By means of difference-frequency generation in OPA 102, part of the energy of the first depleted pump pulse 113 is transferred to the first amplified signal pulse 112 to produce a second amplified signal pulse 114 and a second depleted pump pulse 115.

The second amplified signal pulse 114 and the second depleted pump pulse 115 are separated using a fourth dichroic beamsplitter 108. The depleted pump pulse 115 transmitted through the fourth dichroic beamsplitter 108 is discarded on a beam dump 109. The second amplified signal pulse 114 reflected from the fourth dichroic beamsplitter 108 is the output of the system.

Figure 2:
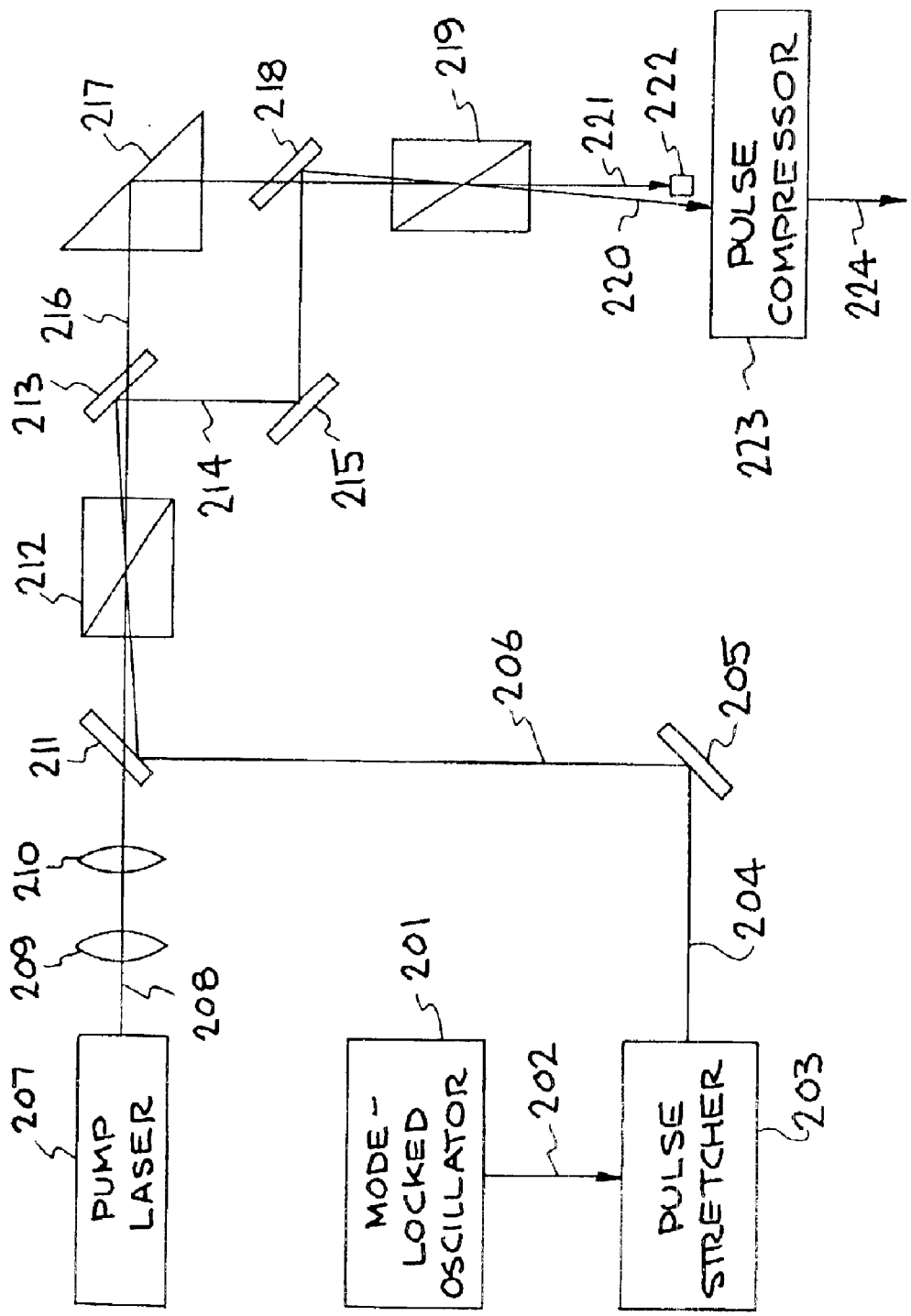
FIG. 2 illustrates another embodiment of an OPCPA system constructed in accordance with the present invention.

An implementation of a nondegenerate OPCPA setup in a CPA system constructed in accordance with the present invention is illustrated in FIG. 2. A mode-locked oscillator 201 produces short pulses 202, which are introduced into a pulse stretcher 203. The pulse stretcher 203 stretches the pulses by a factor $10^3$–$10^4$. Stretched seed pulses 204 emerge from the stretcher 203 and are steered by the mirror 205. Steered stretched seed pulses 206 are incident onto the first dichroic beamsplitter 211 and are reflected from the first harmonic beamsplitter 212. A pump laser 207 produces pump pulses 208, which are introduced into an imaging telescope consisting of two convex lenses 209 and 210. After propagating through the imaging telescope, the pump pulses are incident onto the first dichroic beamsplitter 211 and propagate through the first dischroic beamsplitter 211. The first harmonic beamsplitter 211 is highly reflective for the seed 206 wavelength and polarization, and highly transmissive for the pump 208 wavelength and polarization. The seed 206 and the pump 208 are coupled into the first OPA 214.

By means of difference-frequency generation in the first OPA 214, part of the energy of the pump pulse 208 is transferred to the seed pulse 206 to produce the first amplified signal pulse 214 and the first depleted pump pulse 216. The first amplified signal pulse 214 and the first depleted pump pulse 216 are separated using the second dichroic beamsplitter 213. A turning prism or mirror 217 is used to steer the first depleted pump pulse 216 through the third dichroic beamsplitter 218. A turning mirror 215 is used to steer the first amplified signal pulse 214 onto the third dichroic beamsplitter 218. The third dichroic beamsplitter 218 is highly reflective for the first amplified signal pulse 214 wavelength and polarization, and highly transmissive for the first depleted pump pulse 216 wavelength and polarization. By means of difference-frequency generation in the second OPA 219, part of the energy of the first depleted pump pulse 216 is transferred to the first amplified signal pulse 214 to produce the second amplified signal pulse 220 and the second depleted pump pulse 221. The second amplified signal pulse 220 and the second depleted pump pulse 221 are angularly separated. The second depleted pump pulse 221 discarded on the beam dump 222. The second amplified signal pulse 220 enters the pulse compressor 223. The pulse compressor 223 compresses the second amplified signal pulse 220 to short pulse duration, producing a recompressed amplified pulse 224.

In one test of an embodiment of the system, seed pulses were obtained from a Ti:sapphire oscillator (Femtolaser Femtosource 20HP), with the center wavelength of 820 nm. The oscillator pulses had a 26.5-nm FWHM spectral bandwidth, and their transform-limited FWHM pulse width would be 20 fs. Interferometric autocorrelation of the pulses reveals the pulse width of 33 fs, which is the result of uncompensated dispersion in the output coupler. A broadband pulse selector slices single pulses from the oscillator at a 10-Hz repetition rate.

An advanced low-aberration all-reflective design was used for the pulse stretcher. The stretcher uses a 1480 lines/mm gold diffraction grating. A concave spherical reflector is used in combination with a flat mirror reflector and a mirror-stripe reflector on the diffraction grating to provide positive group delay. Spectral clipping occurs in the stretcher at the bandwidth of >100 nm. The stretched 1 nJ pulses are 600 ps long at their FWHM.

The OPA consists of two antireflection-coated betabarium borate (BBO) crystals. The crystals are cut at a 23.8° angle with respect to their principal axis to facilitate type I phase matching at an external noncollinear angle of 3.7°. The noncollinear angle is optimized numerically to maximize the gain bandwidth. The length of the first crystal is 20 mm, while the length of the second crystal is 15 mm. Both crystals have their output surface wedged at a 2° angle to suppress parasitic oscillation. Both crystals are antireflection-coated for 532 nm, 820 nm, and 1.6 $\mu$m. The pump beam is relay imaged between the two crystals and the beam diameter is adjusted to ~3 mm, for peak intensity near 300 MW/cm$^2$.

A commercially available Q-switched Nd:YAG laser is used for pumping the OPA. The laser is a Spectra-Physics GCR Pro 350-10, equipped with an injection seeder for single longitudinal mode operation. The pump laser produces 1.5-J, 532-nm pulses, with a pulse width of 6.9 ns, at a 10-Hz repetition rate. The supergaussian near-field transverse intensity profile of the pump beam is advantageous for pumping the OPA. This laser also exhibits spatio-temporal evolution characteristic for an unstable resonator.

The 3.2° walk-off of the pump beam is not the dominant factor that reduces the beam overlap in noncollinear OPA. To allow broad bandwidth amplification in BBO, a 3.7° external noncollinear angle is used between the signal and the pump beam. This implies a strong noncollinear walk-off effect over the 15–20 mm crystal length. In addition, the idler beam walk-off occurs with an external angle of 7.4°. The noncollinearity of the signal and pump is achieved in the plane perpendicular to the crystal principal plane. In this way, the cumulative effect of two different sources of walk-off is reduced.

225 mJ is split from the pump pulse to pump the OPA. Pump energy can be continuously adjusted using a waveplate-polarizer combination. A vacuum telescope relays the supergaussian transverse intensity profile between the two OPA crystals in a collimated beam. The diameter of the pump beam in the OPA is ~3 mm, with a peak intensity near 300 MW/cm$^2$. The pump pulse after the first crystal is essentially undepleted, except for the energy lost on dichroic coating inefficiencies. The same pulse is used to pump the second crystal, with a peak intensity near 300 MW/cm$^2$. The seed beam diameter is 1 mm at its FWHM, and it has a gaussian spatial profile. Signal and idler are spatially separated after each amplification stage.

The pulse compressor contains a 1480 lines/mm grating, set at a diffracted angle near 55°. Fine tuning of the compressor grating angle is used to reduce the amount of residual phase in the system. The most significant source of uncompensated quartic phase is the stretcher which contains a spherical mirror. No compensation is necessary for B-integral, since the path length through the gain medium is short. The compressor passes the entire amplified spectrum, with an efficiency of 50%.

Applicants obtained a maximum gain of 6×10$^6$ from the OPA when the noncollinear plane was chosen to be perpendicular to the principal plane of the crystal. The result were pulses with energies of up to 3 mJ amplified in a single pass through only 35 mm of gain material.

Applicants observe a shift of the center wavelength to 840 nm, which is consistent with the gain bandwidth in nondegenerate BBO OPA, which is centered at longer wavelengths (near 850 nm). The small bandwidth narrowing (<2 nm) at the FWHM observed when the OPA operates far below saturation (0.5 mJ) can be attributed to this spectral shift. At the point near saturation (3 mJ), the spectrum is modified further and the amplified FWHM is increased to 49.5 nm. Spectral broadening is the result of different rate of nonlinear conversion for the spectral components of different initial intensity.

Applicants recompressed their pulses in a single-grating compressor, and the autocorrelation trace, the measured FWHM autocorrelation of the recompressed pulse is 104 fs, which is nearly 2 times longer than the FWHM of the calculated autocorrelation of the transform-limited pulse with the measured spectrum. With the inclusion of the spectral phase in the system, the calculated FWHM of the autocorrelation is 108 fs, which is within Applicants experimental error, indicating that we produced 60-fs pulses.

Scientific and industrial applications of the system include generation of energetic femtosecond pulses, chirped pulse amplification (CPA), optical parametric chirped pulse amplification (OPCPA), ultrashort nondegenerate OPCPA, and hybrid chirped pulse amplification.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system for producing a useful optical pulse, comprising:
   a source of an input pump pulse;
   a source of a signal pulse;
   a first dichroic beamsplitter for receiving said input pump pulse and said signal pulse, said first dichroic beamsplitter being highly reflective for said signal pulse and highly transmissive for said input pump pulse;
   a first optical parametric amplifier nonlinear crystal for receiving said signal pulse and input pump pulse, said input pump pulse having energy and said first optical parametric amplifier nonlinear crystal transferring part of said energy to said signal pulse to produce a first amplified signal pulse and a first depleted pump pulse;
   a second dichroic beamsplitter for receiving said first amplified signal pulse and said first depleted pump pulse, said second dichroic beamsplitter being highly reflective for said first amplified signal pulse and highly transmissive for said first depleted pump pulse;
   a second optical parametric amplifier nonlinear crystal for receiving said first amplified signal pulse and said first depleted pump pulse, said first depleted pump pulse having energy and said first optical parametric amplifier nonlinear crystal transferring part of said energy to said first amplified signal pulse to produce a second amplified signal pulse and a second depleted pump pulse; and
   a third dichroic beamsplitter for receiving said second amplified signal pulse and said second depleted pump pulse wherein said second depleted pump pulse is discarded and said second amplified signal pulse results in said useful optical pulse.

2. The system for producing a useful optical pulse of claim 1 wherein said source of an input pump pulse comprises a mode-locked oscillator that produces a short pulse and a pulse stretcher that receives said short pulse and stretches said short pulse to produce said input pump pulse.

3. The system for producing a useful optical pulse of claim 1 wherein said source of a signal pulse comprises a pump laser.

4. The system for producing a useful optical pulse of claim 1 wherein said source of a signal pulse comprises a pump laser and an imaging telescope.

5. The system for producing a useful optical pulse of claim 4 wherein said imaging telescope comprises two convex lenses.

6. The system for producing a useful optical pulse of claim 1 including a pulse compressor for receiving said second amplified signal pulse and compressing said second amplified signal pulse producing a recompressed amplified pulse resulting in said useful optical pulse.

7. A system for producing a useful optical pulse, comprising:
   means for producing an input pump pulse;
   means for producing a signal pulse;
   first dichroic beamsplitter means for receiving said input pump pulse and
   said signal pulse, said first dichroic beamsplitter means being highly reflective for said input signal pulse and highly transmissive for said input pump pulse;
   first optical parametric amplifier nonlinear crystal means for receiving said signal pulse and input pump pulse, said input pump pulse having energy and said first optical parametric amplifier nonlinear crystal means transferring part of said energy to said input signal pulse to produce a first amplified signal pulse and a first depleted pump pulse;
   second dichroic beamsplitter means for receiving said first amplified signal pulse and said first depleted pump pulse, said second dichroic beamsplitter being highly reflective for said first amplified signal pulse and highly transmissive for said first depleted pump pulse;
   second optical parametric amplifier nonlinear crystal means for receiving said first amplified signal pulse and said first depleted pump pulse, said first depleted pump pulse having energy and said second optical parametric amplifier nonlinear crystal means transferring part of said energy to said first amplified signal pulse to produce a second amplified signal pulse and a second depleted pump pulse;
   third dichroic beamsplitter means for receiving said second amplified signal pulse and said second depleted pump pulse wherein said second depleted pump pulse is discarded and said second amplified signal pulse results in said useful optical pulse.

8. The system for producing a useful optical pulse of claim 7 wherein said means for producing an input pump pulse comprises a mode-locked oscillator that produces a short pulse and a pulse stretcher that receives said short pulse and stretches said short pulse to produce said input pump pulse.

9. The system for producing a useful optical pulse of claim 7 wherein said means for producing a signal pulse comprises a pump laser.

10. The system for producing a useful optical pulse of claim 7 wherein said means for producing a signal pulse comprises a pump laser and an imaging telescope.

11. The system for producing a useful optical pulse of claim 10 wherein said imaging telescope comprises two convex lenses.

12. The system for producing a useful optical pulse of claim 7 including pulse compressor means for receiving said second amplified signal pulse and compressing said second amplified signal pulse producing a recompressed amplified pulse resulting in said useful optical pulse.

* * * * *